United States Patent [19]
Keenan

[11] 4,376,538
[45] Mar. 15, 1983

[54] EDUCATIONAL GAME FOR CONSTRUCTION AND IDENTIFYING ELECTRICAL AND ELECTRONIC CIRCUITS

[76] Inventor: Michael P. Keenan, 95 Ponderosa Dr., Hanover, Mass. 02339

[21] Appl. No.: 189,724

[22] Filed: Sep. 22, 1980

[51] Int. Cl.³ .............. A63F 3/00; C09B 1/04; C09B 23/8
[52] U.S. Cl. .................. 273/275; 273/238; 434/224
[58] Field of Search ............... 273/275; 434/224, 118

[56] References Cited
U.S. PATENT DOCUMENTS

| | | | |
|---|---|---|---|
| 3,423,846 | 1/1969 | Arend | 434/379 |
| 3,516,671 | 6/1970 | Estrin | 273/275 X |
| 3,694,931 | 10/1972 | Bialek | 434/118 |
| 3,695,616 | 10/1972 | Weber | 273/275 |
| 4,215,866 | 8/1980 | Shimizu | 273/275 |

FOREIGN PATENT DOCUMENTS
2327323 12/1974 Fed. Rep. of Germany ...... 434/224

Primary Examiner—Richard C. Pinkham
Assistant Examiner—Scott Brown
Attorney, Agent, or Firm—Dahlen & Gatewood

[57] ABSTRACT

An educational game is provided not only for entertainment but for the teaching of the construction and recognition of electrical and electronic circuits. Electrical or electronic circuits can be constructed by the positioning of modules or playing pieces representing certain electrical functions on a game board imprinted with positions for the placement of the modules and the completion of an electrical or electronic circuit between a positive and negative lead of a power source. The game lends itself to actual electrically working versions as well as simulated electrical and electronic versions.

3 Claims, 10 Drawing Figures

FIG. 4
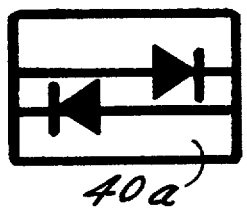
40a
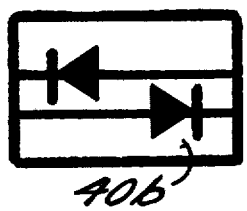
40b
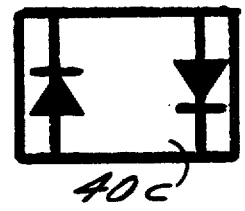
40c
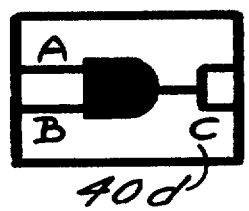
40d
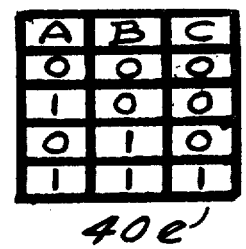
40e
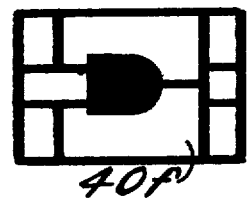
40f
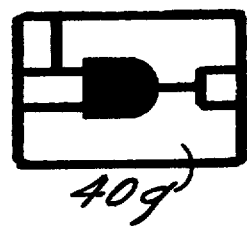
40g
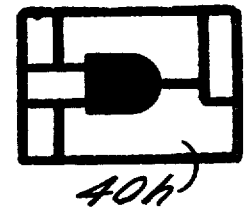
40h
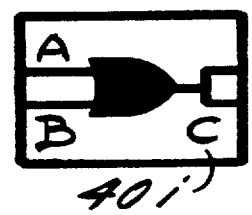
40i
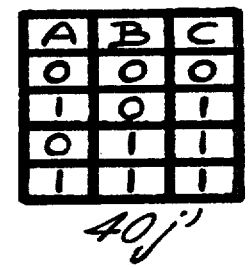
40j
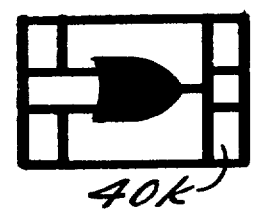
40k
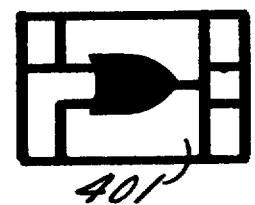
40l
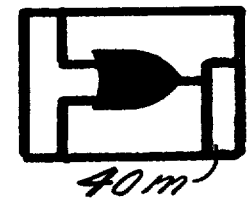
40m FIG. 4
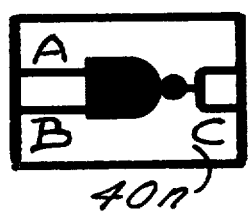
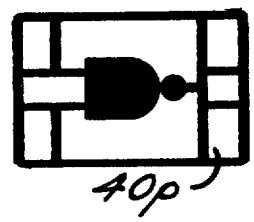
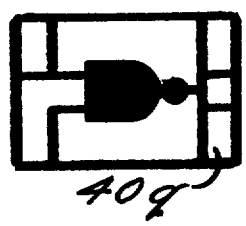
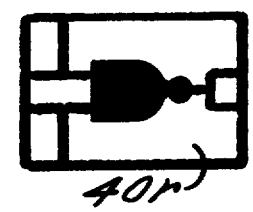
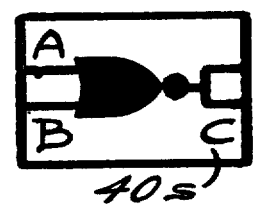
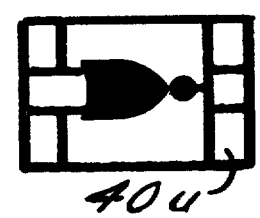
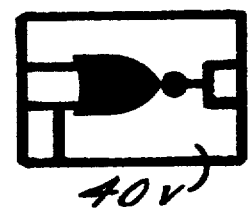
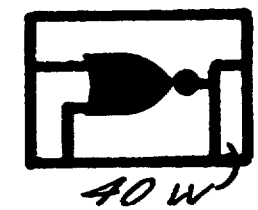

FIG. 7
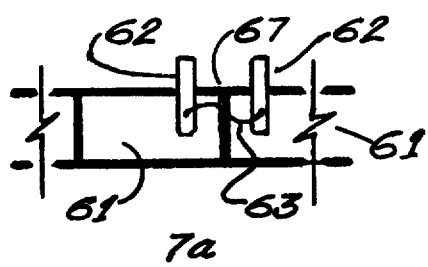
7a
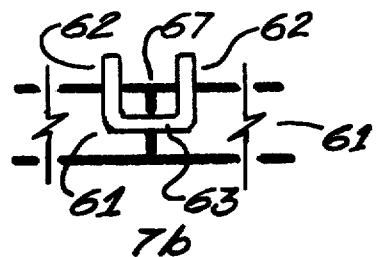
7b
FIG. 8
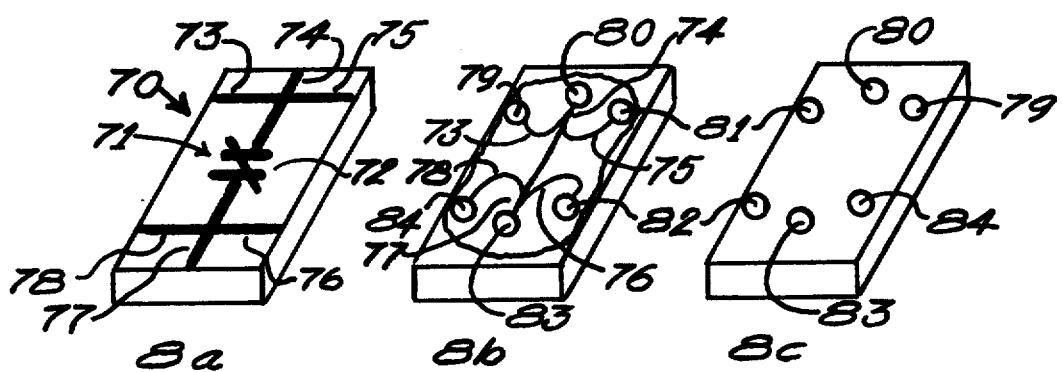
8a  8b  8c
FIG. 10
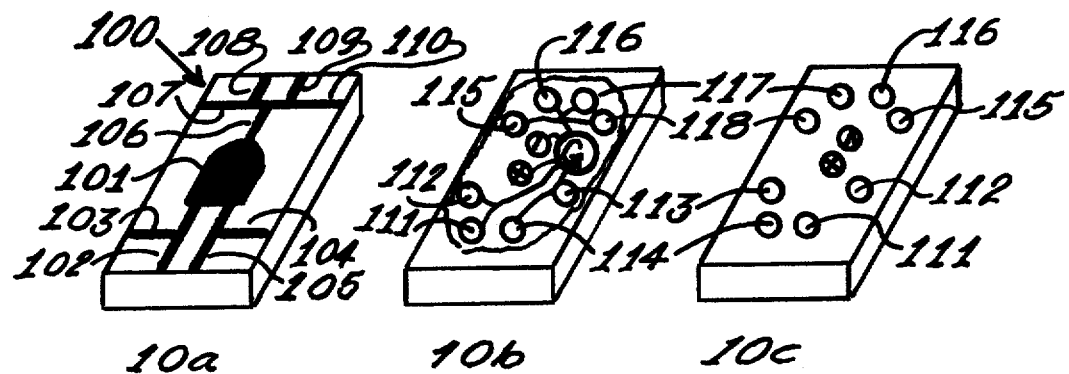
10a  10b  10c

EDUCATIONAL GAME FOR CONSTRUCTION AND IDENTIFYING ELECTRICAL AND ELECTRONIC CIRCUITS

BACKGROUND OF THE INVENTION (1) Field of the Invention

This invention relates to an amusement device and, in particular, to a board game which not only serves to entertain but to educate the players in the construction and tracing of electrical circuits, and, in a more advanced version, electronic digital "gate" circuits.

(2) Description of the Prior Art

Over the last several years a variety of educational devices and games have been developed to entertain and educate students and others in the construction of electrical and electronic circuits, and the use of various electrical and electronic components. Representative of these games and devices are those inventions disclosed in U.S. Pat. Nos. 3,175,304; 3,374,556; 3,404,889; 3,651,381; 3,697,076; and 4,006,538.

U.S. Pat. No. 3,175,304, for example, discloses a visual educational device wherein a lecturer can assemble various electrical circuits in full view of a student body. Thus, as disclosed in the patent, there is provided a flat panel member in which is provided a pattern of electrical junctions and engageable contact apertures. These apertures are engaged, as desired, by various plug-in modules which are provided on their upper surface with various schematic diagrams of an electrical circuit instrumentality, thus assembling an electrical circuit in a step-by-step fashion.

Similarly, there is disclosed in U.S. Pat. No. 3,651,381 an electronic device for constructing various electronic circuits. This device comprises a board on the surface of which is provided a plurality of posts arranged in square patterns. In constructing an electronic circuit, block or modular units, on which are imprinted various electrical symbols, are positioned within the square formed by four (4) posts, in a step-wise fashion. Thus, one completes a predetermined electronic circuit while watching a wiring diagram of the circuit being constructed.

U.S. Pat. Nos. 3,374,556 and 4,006,538 disclose a game and electrical device for the learning about the placement of resistors in an electrical circuit and switching, respectively. The game disclosed in U.S. Pat. No. 3,374,556 can be played by one or more players, the winner being, in the case of group play, the one achieving a certain designated current flow, positioning those resistors selected by him in a circuit otherwise already established on the game board. In U.S. Pat. No. 4,006,538 an educational kit is provided which includes instructional apparatus and a simulator board which permits a student to match the names of switches with their correct symbols and receive an immediate response as to the correctness to the answer, and design assembly, and test relay control circuits.

U.S. Pat. No. 3,404,889 discloses an electrical game apparatus having two playing areas concealed from one another. Corresponding grid networks are associated with each of the playing areas, each network having a multiplicity of circuit junctions, each junction being provided with a switch. These are selectively operated by either player for opening or closing the circuit paths through one of the junctions. This switching operation at the same time performs the same function at the corresponding junction on the opposing players area, the opponent, however, not knowing which switch was thrown. Test means are provided to each player for testing circuit paths for continuity. The object of the game is for a player to establish a circuit path from one side of the game board to the other in his particular playing area.

U.S. Pat. No. 3,697,076 discloses a board game apparatus comprising a board and playing pieces constructed so as to produce visual and audible indications in response to manipulation of the playing pieces during the game. Attached to the game board are sources of electrical energy, electrical indicators, switches and patterns of electrodes which are repeated at board positions occupied by the playing pieces. These electrical components are connected so as to form incomplete circuits. The playing pieces bear hidden electrodes which cooperate with the other electrical components to complete one of the circuits and actuate one of the indicators when the pieces occupy certain combinations of positions on the board.

SUMMARY OF THE INVENTION

There is provided in accordance with the present invention a competitive, educational game, to be played by two players, for the learning of the construction and tracing of electrical and electronic circuits. The game according to the invention comprises in its basic aspects a game board on which is imprinted two playing areas of like pattern, each comprising a plurality of horizontal and vertical rows of abutting playing positions, and a set of a plurality of modules or playing pieces, each of which represents an electrical or electronic function.

The outer and inner horizontal rows of playing positions imprinted on the game board are connected respectively to a positive and negative lead imprinted on the board which in turn are indicated as connected to the positive and negative terminals of a conventional power source. Intermediate the playing positions located in the most inner horizontal row in each of the vertical rows of such positions and the negative lead are provided in each the imprint of an electrical powered lamp or the like which is activated by positioning of the modules on the game board to complete an electrical circuit.

Quite advantageously the educational game of the invention can be constructed in a manner either to simulate construction of electrical and electronic circuits, or electrically working versions can be provided. And the circuits constructed according to the game disclosed can be the more simplified electrical circuits or the more sophisticated electronic circuits, e.g., those employing use of modules or playing pieces which symbolize various digital electronic devices or "gates".

A unique feature of the game disclosed is that while the selection of a module for play by a player is completely at chance, the outcome of the game depends mostly on the skill of the player, as the playing piece selected must be played at that point in time or "discarded", i.e., taken out of play. The player can use the playing piece selected to construct a circuit in his own playing area, or to obstruct the completion of a circuit by his opponent, depending of course upon the particular piece selected during his turn of play. The winner is the player having completed the most number of circuits which, in the electrically operated version of the game may be indicated by lamps or light-emmitting diodes (LED's) activated on completion of a circuit. In the more simplified version of the game visual recognition is required in the placing of the modules in the playing areas to determine if one or more circuits has been completed.

Quite advantageously, as the game involves use of modules representing a variety of electrical and electronic functions, a player tends to develop a great deal of skill in circuit recognition and construction, while at the same time being somewhat entertained. Moreover, the random nature of the selection of playing pieces, as well as the different ways in which any two players will play the particular pieces selected, makes it highly unlikely that any two games will ever be played exactly in the same way. Thus, because of this, the game is believed likely to invite continued interest.

BRIEF DESCRIPTION OF THE DRAWING

FIG. 4 shows schematically various modules or playing pieces that can be used in a more sophisticated simulated version of the game involving electronic components, rather than the electrical instrumentalities as shown in FIG. 2 of the drawing;

FIG. 7 is a side view of the game board shown in FIG. 6, showing various commercially available male jacks that can be imbedded in the game board for the practice of the invention;

FIG. 8(a) is a view in perspective of a module or playing piece according to the invention that can be used in the electrically operating version of the game, showing on its upper surface a schematic electrical symbol and wiring connections;

FIG. 8(b) is a view in perspective with the top surface cut-away showing the internal wiring of the module to the various female jacks; and FIG. 8(c) is a bottom view in perspective of the module shown showing the appropriate placement of the female jacks, to be combined with the male jacks on the playing board;

FIG. 10 shows a module symbolizing an electronic component and its internal wiring connection to the various female jacks located therein.

DETAILED DESCRIPTION OF THE INVENTION AND THE PREFERRED EMBODIMENTS THEREOF

Figure 1:
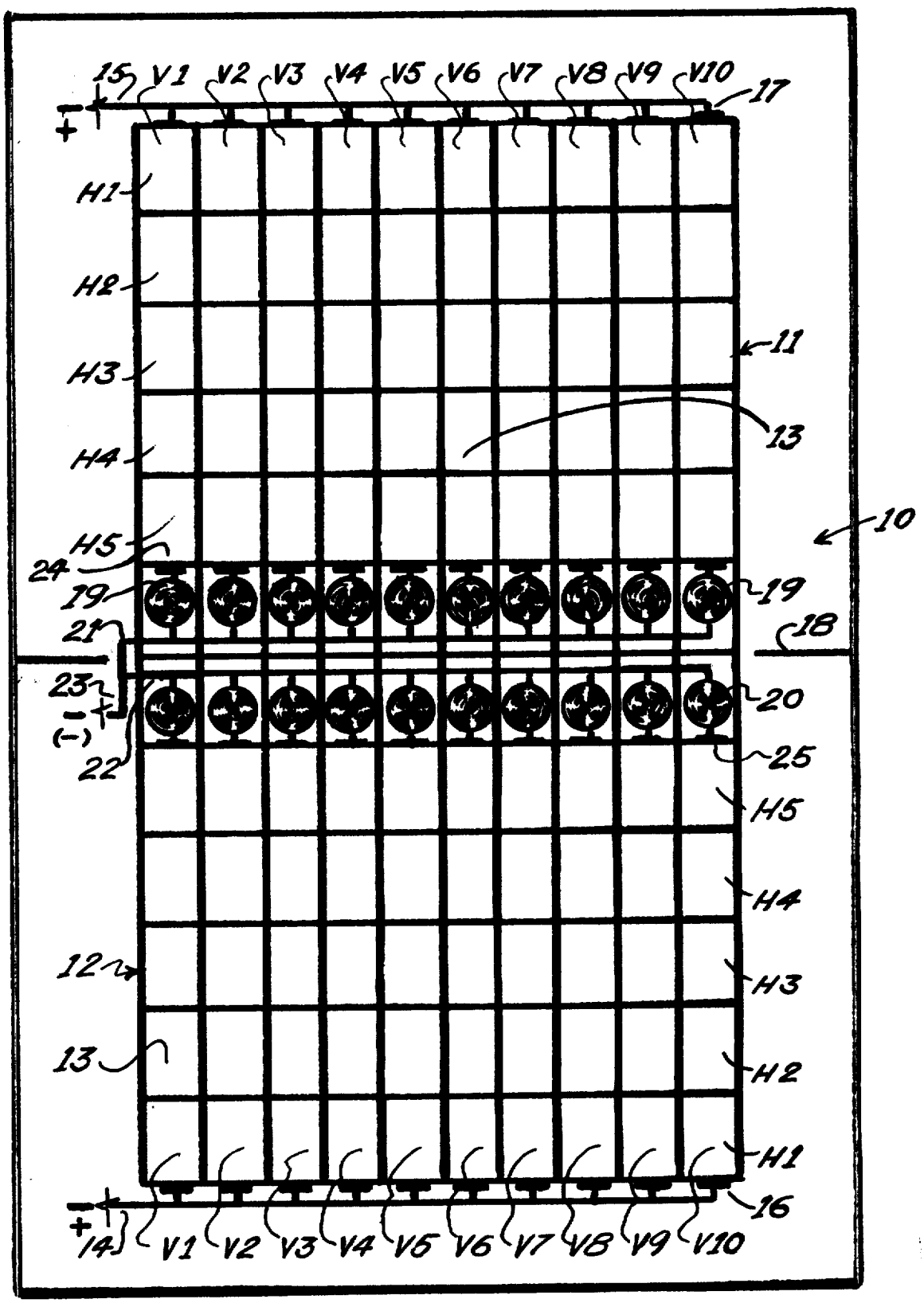
FIG. 1 is a schematic illustration of a game board used in the playing of the simulated versions of the game disclosed herein.

Turning now to the drawing, there is shown in FIG. 1 thereof a game board 10 for use in playing one version of the educational game set forth herein. As seen from the drawing, game board 10 is divided, e.g., by an imprinted pattern thereon, into two playing areas 11, 12, one for each player, and each playing area is further divided into a plurality of horizontal and vertical rows, H-1 to H-5 and V-1 to V-10, each row comprising a plurality of abutting, individual, rectangular-shaped playing positions, as represented by reference numeral 13. Thus, each individual playing position 13 is located at the coordinate of a vertical and horizontal row or location, e.g., in playing area 11, playing position 13 at H-4, V-6.

Imprinted along the outer horizontal edges of game board 10, as shown in FIG. 1, are lines 14, 15, representing positive electrical feeders from a conventional power source, e.g., a battery. These positive feeders are connected in parallel fashion, as shown in the drawing, by reference numerals 16, 17 to the outer edges of each playing position 13 located in each of the respective outer horizontal rows, H-1. In the center of the board, along and on each side of its fold line 18, as conventionally provided in game boards, are imprinted symbolic representations of pairs of indicating lamps 19, 20, these being each in turn connected to lines 21, 22 which, in turn, are joined together forming line 23 representing the negative feeder line from the power source.

The indicating lamps 19, 20 are, moreover, individually connected to respective, adjacent playing positions 13 located in the most inner horizontal rows, H-5, as indicated schematically by reference numerals 24, 25, respectively. Thus, there are provided in each respective playing areas 11, 12, potentially 10 different vertical electrical circuits, through the abutting player positions 13 in each of the vertical rows of player positions.

Figure 2:
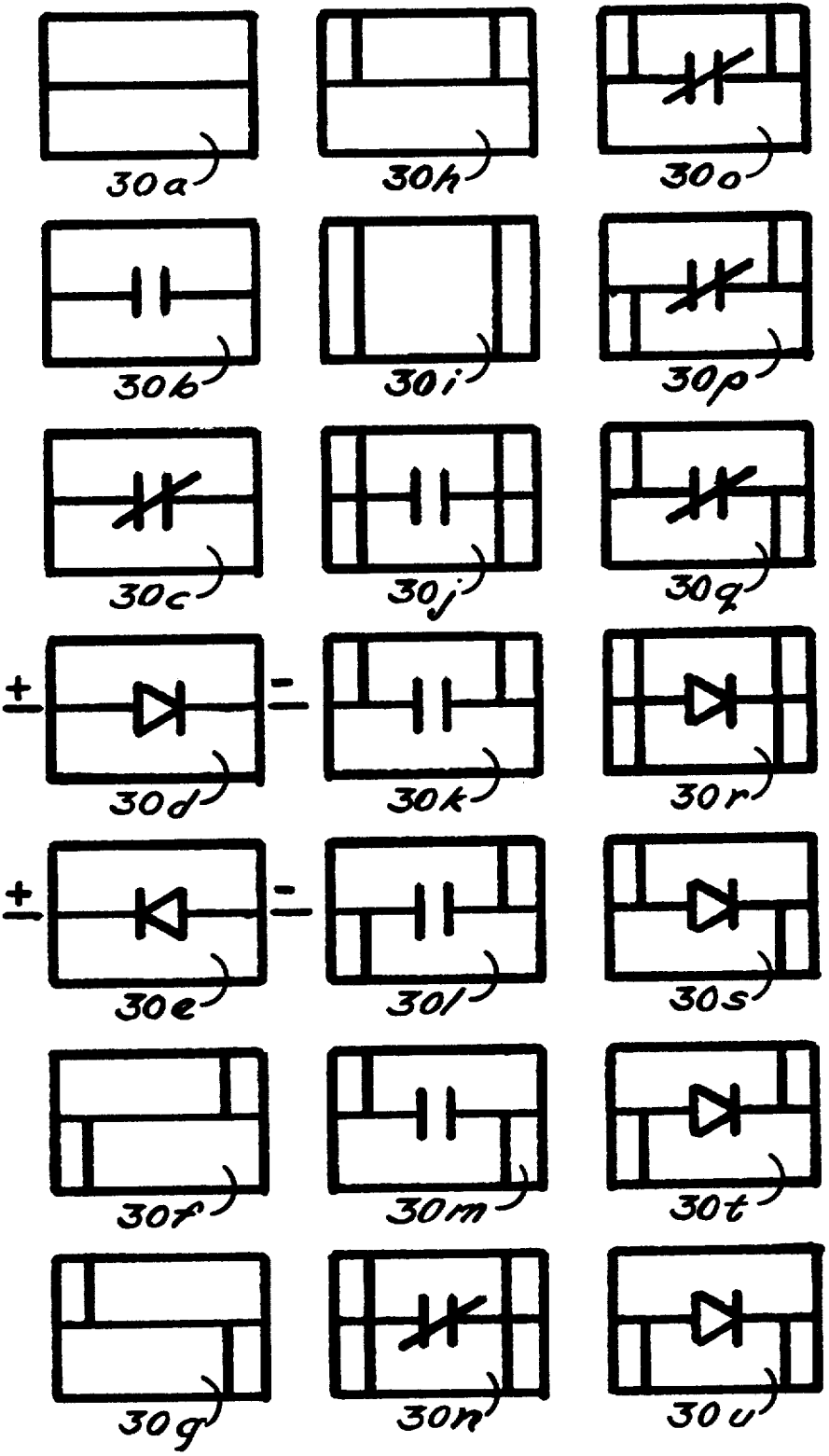
FIG. 2 represents schematically various modules or playing pieces, showing various wiring combinations, that can be used in the playing of the simulated version of the game.

For use in combination with game board 10 (FIG. 1), and the playing of a more simplified version of the game disclosed herein, there is provided a set 30 of a plurality of different, rectangular-shaped modules or playing pieces, e.g., 30(a), 30(b), etc., as shown in FIG. 2, representing various electrical components or instrumentalities for constructing and identifying an electrical circuit. Each of the modules is provided with, e.g., by imprinting or the like, a schematic symbol that is generally accepted in the electrical industry as truly representative of its function. Thus, for example, module 30(a) represents a wire for the passage of electrical current, an open contact is represented by module 30(b), and module 30(c) represents a closed contact. In the case of module 30(b) current will not pass through; however, with module 30(c) current may pass. Modules or playing pieces 30(d) and 30(e) represent diodes which in the first case allows current to flow but in the second case opposes it. As is conventional in the case of a diode, current flows from the positive to the negative side.

Other possible wiring combinations which lend interest to the playing of the game, as well as providing for more realistic wiring construction encountered in actual wiring situations are represented by modules 30(f)–30(u). These wiring constructions allow for by-passing an open circuit or an opposing diode and are a key factor in the games successful playing.

It will be appreciated that the number of modules or playing pieces actually provided for use in playing this version of the game can vary considerably, as can the number of playing pieces representing any particular electrical function. However, I have found that satisfactory results will be accomplished where the modules or playing pieces provided are as indicated below:

| MODULES OR PLAYING PIECES INVOLVED | |
| --- | --- |
| MODULE/PLAYING PIECE | NO. OF PIECES |
| 30(a) | 15 |
| 30(b) | 2 |
| 30(c) | 8 |
| 30(d) | 1 |
| 30(e) | 1 |
| 30(f) | 1 |
| 30(g) | 1 |
| 30(h) | 2 |
| 30(i) | 3 |
| 30(j) | 15 |
| 30(k) | 2 |
| 30(l) | 1 |
| 30(m) | 1 |
| 30(n) | 13 |
| 30(o) | 10 |
| 30(p) | 8 |
| 30(q) | 8 |
| 30(r) | 4 |
| 30(s) | 1 |
| 30(t) | 1 |
| 30(u) | 2 |

Thus, in this particular case, the total number of playing pieces will be 100, one for each playing position; however, more or less playing pieces, as desired, can be provided, depending somewhat on the board layout, as can the number of modules with respect to any particular, or other electrical function. Where there is a lesser total number of playing pieces, there will be, in general, fewer opportunities for completion of a circuit, requiring the exercise of greater skill by each player in the playing of the game.

Game board 10 can be, as will be appreciated, constructed of various materials, as is conventional in the manufacture of games involving a game board component. The game board can be, for example, of wood or plastic, on the top surface of which is imprinted, inscribed, or painted, the pattern of the board as shown in FIG. 1 of the drawing. The more preferred game board, however, will be constructed of hardboard or similar material conventionally used in the manufacture of game boards, for use with board games. The inner or top surface of the board can be directly imprinted with the playing board pattern, or such a pattern or layout can be provided on a separate paper layer which is then adhesively laminated to the hard board surface. The playing surface layout on the board can be provided in various suitable multi-colored forms representing the playing areas, positions, power lines, lamps, etc. Desirably the playing surface will be provided with a protective mar-resistant finish, providing not only for long and repeated usage, but a board surface that is of continued, pleasing appearance. The outer surface of the hard board can be covered with various lamina, e.g., decorative paper lamina, or lamina of a different color than that of the playing surface, showing the name of the game, company name, etc., as desired.

The game board can obviously be of any size and shape desired, however, the playing surface is preferably of rectangular shape, as shown in FIG. 1 of the drawing. Such a board can be, for example, approximately 15¾ inches × 18½ inches, similar in size to that of board games now in common usage. Playing position 13 will, in this case, desirably be approximately 1½ inch × 1 inch, and the modules or playing pieces will be of like size. The modules can be of hardboard covered with suitably laminated paper imprinted with the desired electrical schematic symbol, or of plastic, wood or other materials commonly used in games. When placed on the board, the modules or playing pieces should abut showing the existence of continuity of an electrical circuit constructed.

As shown in FIG. 2 whatever the material of construction, the module top surface is provided with suitable electrical symbols. The symbol can be imprinted according to usual techniques directly onto the surface of the module, or provided on a separate layer which is subsequently laminated to a modular base. In the case of a wooden module, the schematic symbol can be, if desired, inscribed or burned into the surface. The symbol can be provided in the case of a plastic module in conjunction with an injection molding operation. A module, in some cases, can be provided with as many as six possible connections at its perimeter, one at either short end and two on either side. The spacing for these connections must be obviously co-ordinated in all cases so that they are the same on each and all of the modules. However, in general, the connection will be in the middle at the short ends of the module and dimensioned equidistant from the corners on the sides of the module. Reference to FIG. 2 of the drawing showing the various modules involved will make this more clear.

In the playing of the game, the game is governed by the basic rules of electrical circuits. It is generally accepted that electrical current flows from positive to negative, hence the object of the game is for a player to pick up a feed or feeds from the positive side and place a module or playing piece in his playing area so as to cause the current to flow through various modules placed on the board to feed a lamp or other indicator of a completed electrical circuit. A player may also, by the discriminate placing of a module or playing piece, block the completion of one or more circuits being constructed by the opposing player. For example, such a player may place a diode 30r, or open contact 30j, 30k (See FIG. 3) in a manner that would oppose the flow of current.

To play the game, the module set 30 is first placed in a container (not shown), which may or may not be provided as a component of the game. Such a container can be a box, or even a paper bag. Anything will suffice as a container that will hold the module set and that precludes a player from seeing the playing piece being selected. The two players, alternately, select, one-at-a-time, a playing piece from the container, and places it in one or the other of the playing areas so as either to construct an electrical circuit in his area or oppose such a construction by his opponent. A module or playing piece selected must be played, or discarded, i.e., taken out of play. If not played, it is not put back into the container.

As the object of the game is for a player to complete the most possible number of circuits on his side of the game board, i.e., light the most lamps 19 or 20, blocking the possible completion of a circuit by his opponent is an important strategy. Thus, having selected a module that will tend to accomplish this purpose, the player may, quite advantageously place that module in an opponent's playing location next adjacent to a lamp to be lighted, if that position is free. In a similar manner, to prevent his opponent blocking circuit completion, the player who has selected a module providing a number of possible avenues for completing a circuit, e.g., the module 30(n), may decide to place it in a playing position next adjacent to one of the lamps in his playing area.

A player can place a module selected in any location desired, in either playing area of the board, limited only by the particular module, the availability of the playing location, and the player's over-all strategy.

Where a large number of playing pieces are provided with the game, e.g., 100 or more playing pieces, it will be found that this will lend considerable variety in play. However, it will be found rare that all the playing pieces will be used, before the game is completed. Most games will have been finished long before all the modules have been played, e.g., perhaps less than 50 or so; however, this depends somewhat on the modules selected, as well as upon the skill of the players involved.

The player completing the most possible number of circuits on his side of the playing board, first, in general, wins. In other words, the player having the most number of lamps lighted first. For example, if during the course of a game, both players have had two of their lights blocked, the first one of the player's lighting eight lamps wins. There is no tie. However, if one player has two lights blocked and the other only one, the player with two lamps blocked will not be the winner, even though he lights eight lamps first, and the other player has only lighted seven. The game will continue, until the other player has either completed nine circuits, or is blocked in that effort.

Figure 3:
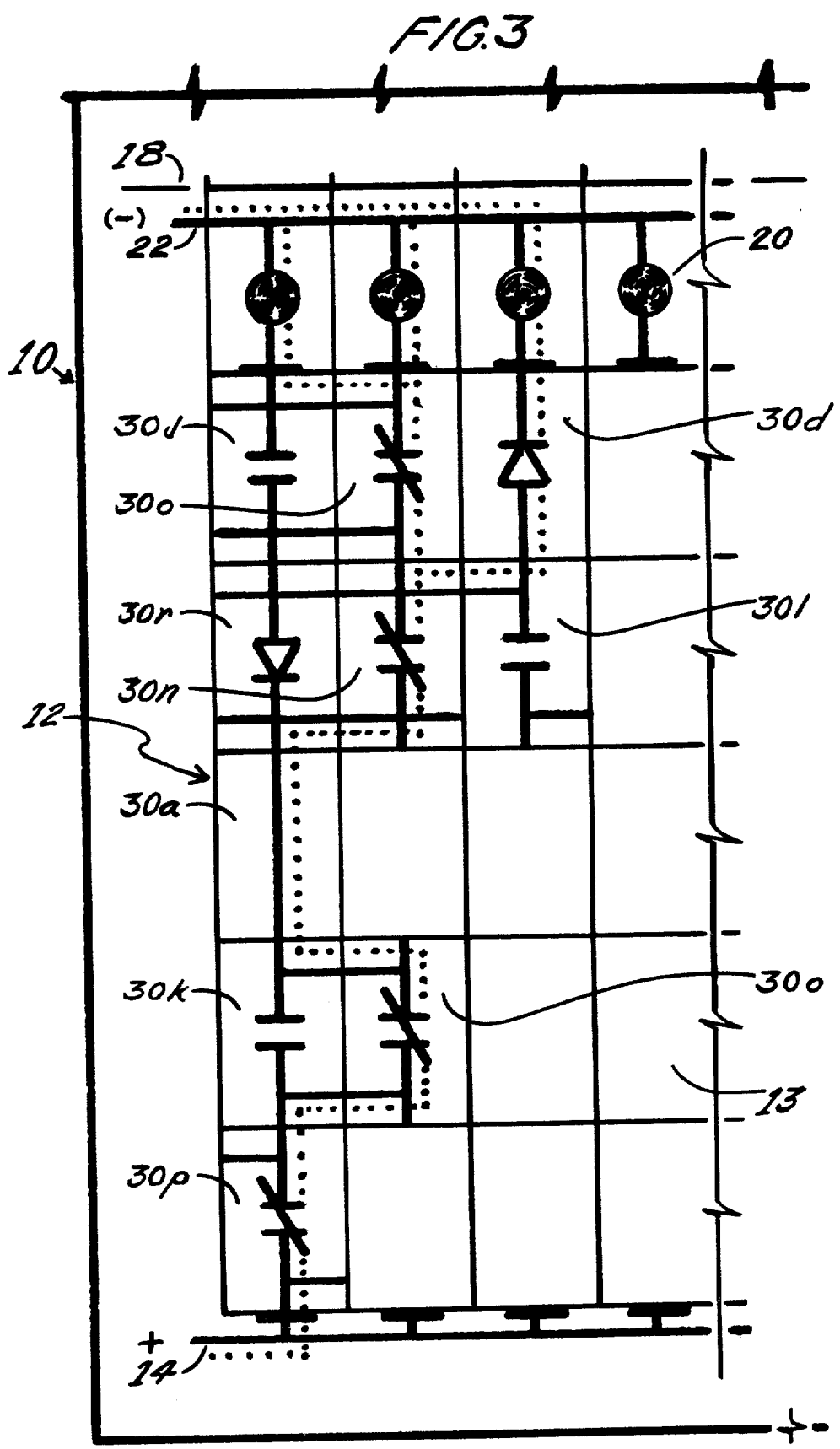
FIG. 3 shows a portion of the game board shown in FIG. 1 with certain modules of FIG. 2 placed thereon, representing a typical game according to one aspect of the invention in progress.

Referring more particularly to FIG. 3 of the drawing, there is disclosed therein a portion of playing area 12 of game board 10, showing just how the playing pieces can be positioned to construct an electrical circuit during the course of a typical game. Or to oppose its construction. Thus, as indicated by the dots, electrical circuits have been successfully completed in three instances, illuminating schematically three representative indicating lamps 20, even though the opposing player has played modules 30(k), 30(r), and 30(j), in an effort to block the construction of an electrical circuit.

In a somewhat more sophisticated version of a game according to my invention, there is provided a set 40 of modules or playing pieces, as shown in FIG. 4 of the drawing, each representing symbolically certain standard solid state devices, e.g., diodes and "Gates". As indicated in FIG. 4, there are provided for use in this version of the game, modules representing (1) diodes in various wiring combinations (40(a)–40(c)); (2) "AND" Gates in various wiring combinations (40(d), 40(f)–40(h)); (3) "OR" Gates in various wiring combinations (40(i), 40(k)–40(m)); (4) "NAND" Gates in various wiring combinations (40(n), 40(p)–40(r)); and (5) "NOR" Gates in various wiring combinations (40(s), 40(u)–40(w)). These modules or playing pieces are symbolic of electronic circuitry having definite operating characteristics and are accepted in the electronic industry as standards. These characteristics are defined in the form of "Truth" tables, as shown in FIG. 4, for "AND" Gates 40(e), "OR" Gates 40(j), "NAND" Gates 40(o), and "NOR" Gates 40(t), respectively.

Unlike the electrical components in the earlier disclosed simulated version of my game, "Gates" don't actually allow current to pass through them but are turned on if the right conditions exist at their inputs and, in turn, feed the inputs of other "Gates". Thus, referring to the truth table for "AND" Gates 40(e), and referring more particularly to "AND" Gate 40(d), a "1" at the input or output of a module, indicates the presence of a voltage at that point. A "0" signifies the absence of a voltage. For the purposes of this game, a "1" will always prevail. Therefore, if both "A" and "B" of "AND" Gate 40(d) are connected to a positive lead, a voltage will exist at "C", as indicated in the truth table.

Although as obviously suggested by FIG. 4, it will be appreciated that a wide variety of wiring combinations can be provided for the various modules to be used in the play of the game. Those actually shown in the drawing are merely representative of what can be used. Other wiring combinations can obviously be constructed. Moreover, the set of modules 40 is not necessarily limited to any total number that can be used in the play of the game, or the modules to any particular wiring construction. As seen from FIG. 4, the wiring connections at the outer perimeter of a module can number as many as eight, two per side (See, for example, Module 40(f)). The main thing is that the spacing of the connections on the respective sides be standard among all modules. The greater the total number of playing pieces and the greater the variety of wiring combinations, the greater will, of course, be the interest and challenge, in playing the game. Moreover, the greater the variety of wiring constructions, whether electrical or electronic components, the greater will one's skill become in recognition and tracing of electrical and electronic circuits.

In the practice of the invention, I have used a module set 40 having mostly a variety of "AND" and "OR" Gates, representing 25 different wiring combinations, respectively. The numbers of modules representing each of the different wiring combinations can, of course, be widely varied. However, I have found it quite satisfactory to limit these numbers in most cases to one or two modules. However, in the case of modules 40(d), 40(f), 40(i), and 40(k), the set used by me included several duplicates, e.g., 6, 7, 6, and 13, respectively.

Figure 5:
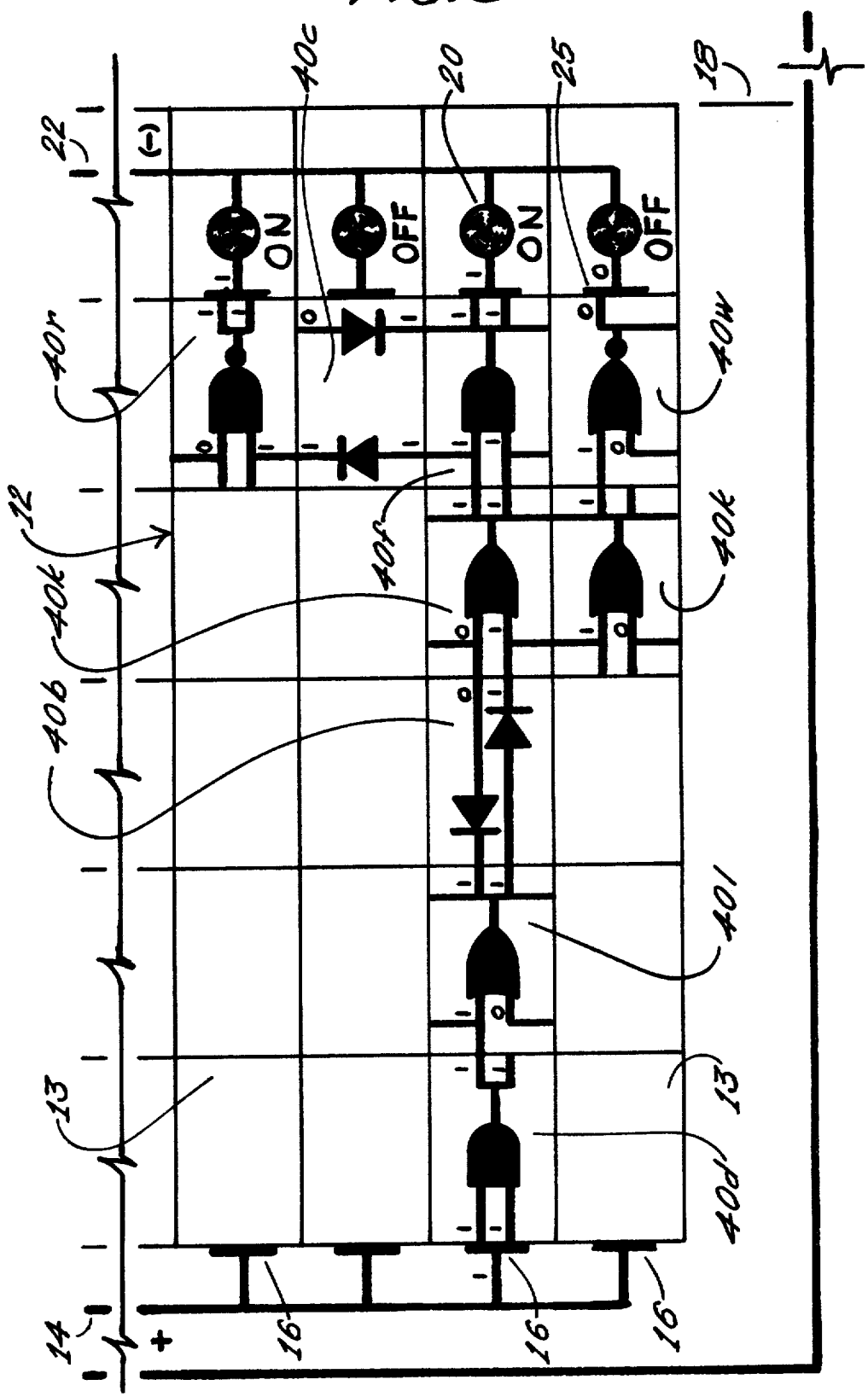
FIG. 5 shows schematically a typical game in progress involving electronic circuitry, using the modules shown in FIG. 4 but using the same game board as disclosed in FIG. 1 of the drawing.

Contrary to the earlier disclosed version of the game, wherein the modules or playing pieces can be installed on the game board in either direction, the modules of set 40 representing solid state devices, e.g., "Gates", can be positioned on the game board in only one direction, as is indicated more clearly in FIG. 5 of the drawing, showing a typical game in progress using the modules of FIG. 4. Referring to FIG. 4, and in particular to "AND" Gate 40(d) and "OR" Gate 40(i) inputs to these devices are indicated by "A" and "B", and "C" indicates the output. Thus, referring to truth tables 40(e) and 40(j), as shown in FIG. 5 modules have been placed by the players in the portion shown of playing area 12 of game board 10, to complete two circuits. And the completion of two circuits have been blocked.

Tracing the completed circuit in FIG. 5 in vertical row V-9, it is seen that in module 40(d) a voltage is present in both inputs "A" and "B", as this module is connected to the positive lead 14 by means of connection 16. Thus, referring to truth table 40(e), a voltage is seen to be present in both outputs of "AND" Gate 40(d). Connected to "AND" Gate 40(d) is "OR" Gate 40(i); however, a voltage "1" is present in only one of its inputs, i.e., "A". Input "B" is not connected to a voltage source; therefore, no voltage ("0") is present at that point. Nevertheless, as seen by truth table 40(j), a voltage is present at the output. Diode 40(b) permits current to pass in one line, the lower one, and blocks it in the other. Thus, there is a voltage present in one of the inputs of "OR" Gate 40(k), as indicated, and consequently there is a voltage present at each of its outputs. This being the case, a voltage is present, as indicated at the inputs to "AND" Gate 40(*f*), and the circuit is completed, activating electrical lamp 20, which is indicated on the drawing as "ON". As will be apparent also in reference to FIG. 5, module 40(*f*), in association with module 40(*c*), which in turn is in association with module 40(*r*), completes a further circuit, and a further lamp 20 is lighted. Thus, two lamps 20 are turned "ON" and two are blocked, i.e., "OFF".

The object of the game involving electronic instrumentalities is the same as that earlier described using electrical instrumentalities, i.e., to light the most possible lamps first. However, those familiar with electronic devices will appreciate that since "NAND" and "NOR" Gates will automatically turn an adjacent lamp on, the game will need to continue until the opposing player has exhausted his ability to extinguish the indicating lamp, unless he obviously has lost the game.

In order to better keep track of the game's progress, in either of the simulated versions, it may be found desirable to place colored markers on lamps, as a circuit is completed, or blocked. Thus, markers, or discs, of three different colors, e.g., red, green, and gold, corresponding to the size of the lamps printed on the game board can be used. When a circuit is blocked, a gold marker is placed on the lamp. When a lamp is lighted, a player will place either a red or green marker on the lamps, depending on which color marker is his.

Figure 6:
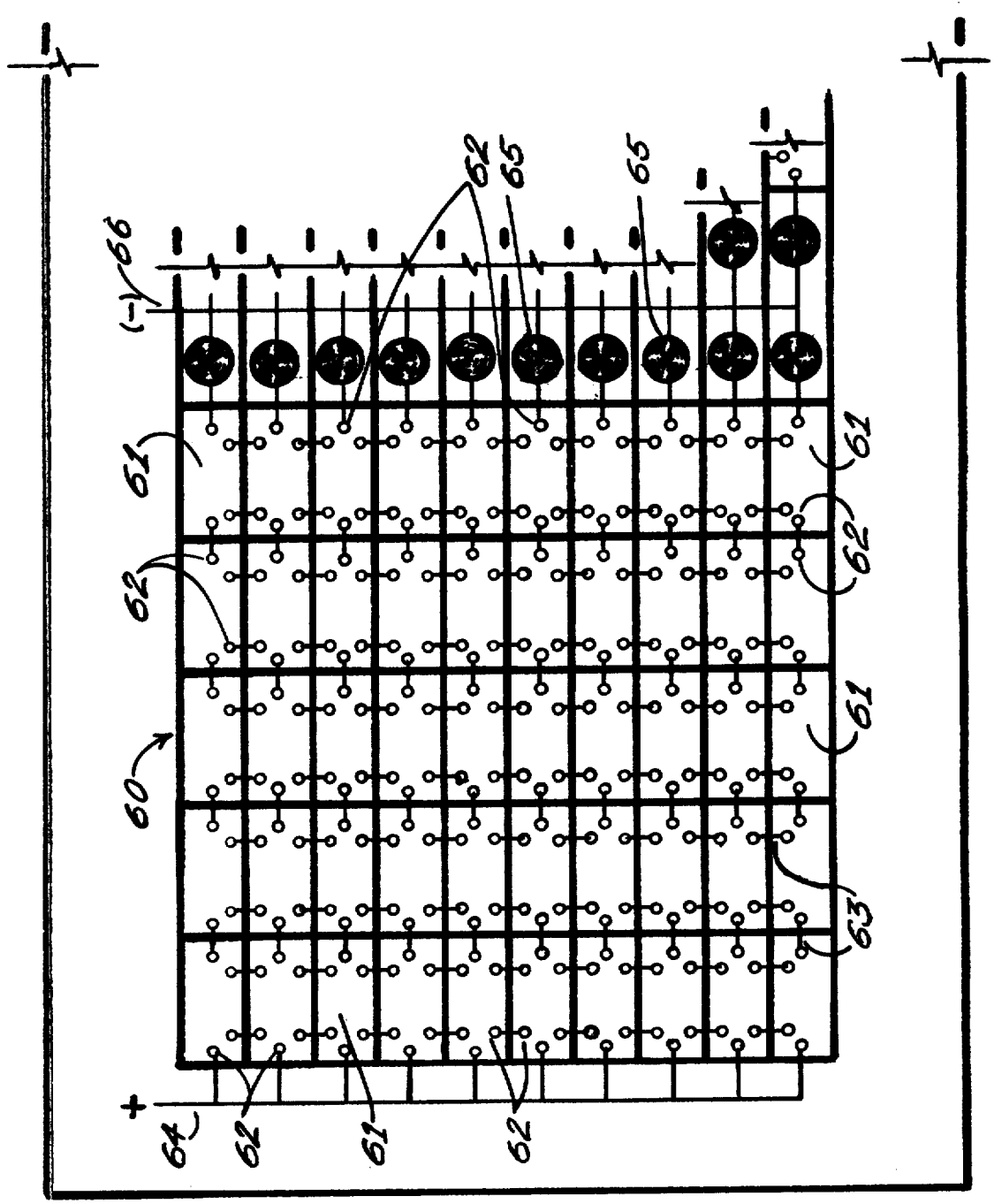
FIG. 6 shows schematically one playing area of a game board used in an electrically operating version of the game according to the invention.

Referring now to FIG. 6 of the drawing, there is shown therein playing area 60 of a game board for use in an electrically operated version of the game disclosed herein. The game board, as will be appreciated, is very similar in layout to that of the game board 10, earlier described with regard to the simulated version of the game. However, instead of simulated circuitry, the game board and modules used will actually cooperate together in the construction of an electrical or electronic circuit; and the actual lighting of a lamp or light emitting diode (LED).

As shown in the drawing, each playing location as represented by reference 61 is provided with a plurality of male jacks 62. Those jacks next adjacent to a neighboring playing location, horizontally and vertically, are interconnected electrically together, as indicated by interconnecting wires 63, and jacks 62 are connected in parallel to positive lead 64. At the inner end of the vertical rows of playing locations, jacks 62 are in turn connected to electrically operating lamps 65, connected in parallel to negative lead 66 of a power source (not shown), for example, one or more conventional flashlight batteries.

Male jacks 62 need not be of any particular design or configuration. Any of various such jacks conventionally used, and commercially available, will be found satisfactory in the practice of this invention. The main requirement is that whatever design or size male jack is used, one be used to effectively cooperate with the female jacks (hereinafter described) in the modules or playing pieces to be used. In general, either of the type jacks disclosed in FIG. 7 will suffice. As shown therein, in FIG. 7(*a*), male jacks 62, each having the configuration of a cylindrical-shaped pin, are vertically embedded in adjacent playing location 61 of the game board. These jacks are electrically connected together by an inner-connecting wire 63, also, as is disclosed embedded within the game board. However, it will be appreciated that wire 63 need not necessarily be embedded; it can lie on the playing surface, if desired, and can take the form of a printed band. An alternative male jack is shown in FIG. 7(*b*). As shown therein, the male jacks and interconnection 63 are of unitary construction, taking, as shown, the form of a flat-bottomed "U".

It will be appreciated that although in FIG. 7, playing locations 61 are seen to be divided from one another by dividing lines 67, this need not necessarily be the case. The body of the game board can be of one solid piece construction, e.g., of molded construction, with the playing surface design or layout imprinted on a separate lamina, subsequently laminated to the game board body.

In FIG. 8 there is shown the construction of a module or playing piece, as designated generally by reference 70 for use in conjunction with the game board such as is disclosed in FIG. 6. Module 70 is provided, as are the playing pieces in module set 30 earlier disclosed, with a symbolic representation 71 on its top surface, representing some desired electrical instrumentality and its wiring. In this case, module 70 represents, as shown in FIG. 8(*a*), a closed contact 72 with interconnecting wires or leads represented by reference numerals 73, 74, 75, 76, 77, and 78. As shown in FIG. 8(*b*) wherein the inside of module 70 is disclosed by cutting away the top surface thereof, wires 73–78 are connected to female jacks 79–84, respectively. As the module represents in this case a closed contact, it will be appreciated that this is represented by a continuous length of wire between jacks 80, 83 and that leads 73, 75, and 76, 78 can be connected directly to female jacks 80, 83, if desired. The female jacks, as shown by reference to FIG. 8(*c*), showing the bottom surface of module 70, are conventional dead bores suitably spatially arranged and of such dimensions as to cooperate and form electrical junctions with corresponding male jacks 62 on the game board.

The game board as disclosed in FIG. 6 can be of any suitable non-conductive material, e.g., wood or of plastics such as nylon, polyvinyl-chloride, polyethylene, polyester, etc. These plastic compositions can include various fillers and coloring agents, so long as these are also non-conductive. If of plastic, the male jacks, which can be of a commercially available "pin-type" or "knife-switch type" can, if desired, be embedded during manufacture, by, for example, conventional injection molding operations. As in the case of the simulated version of the game earlier disclosed, six jacks can be arranged around the perimeter of the rectangular-shaped playing location. And corresponding jacks in adjacent playing locations will be connected together, e.g., either by embedding inter-connections within the game board, or connections on the surface of the game board body beneath the lamina carrying the artwork showing the board layout.

To provide greater ease in, and to facilitate, removal of modules from the game board, space can be left between adjacent playing locations, i.e., between each two vertical rows. Thus, a player will be able to better grip a module for its removal, once the game is completed. In this case, suitable artwork should be provided on the game board to indicate the presence of inter-connections between adjacent jacks. An alternative to this is to provide finger-grips or cut-outs along the edges of the modules.

The modules or playing pieces, like the game board in this electrical version of my game, should be manufactured of non-conductive material, having female jacks embedded within the material that corresponds in location to the six male jacks on the game board. It will, of course, be necessary that in all modules six jacks be provided in order that the module selected can be played in any desired location on the game board. The top surface of each module is imprinted with an appropriate electrical symbol, and where no inter-connection is indicated, e.g., the open contact type such as module 30(b), no wires will be connected internally to those respective female jacks. Thus, when combined with a male jack on the game board no circuit will be completed. As will be appreciated by those skilled in the electrical art, the method shown of interconnecting electrically the modules or playing pieces to the game board is not limiting on the invention. Other methods can be used, as desired. Instead of the male jacks being in the game board, and the female jacks being the modules or playing pieces, this is not critical. The reverse construction can be used instead, if desired.

The play of the game for the electrical version is the same as that for the simulated version earlier disclosed. Modules or playing pieces are drawn, one-at-a-time, alternately, by the players. The module drawn, completely at random, must be used by that player to either construct an electrical circuit in his area of play or oppose such construction by his opponent, or the playing piece must be taken out of play. It cannot be held onto for later use. When a circuit is completed, an electrical lamp 65 will be turned on by the low voltage power source, e.g., a battery connected to, and if desired, incorporated into the game board, in a suitably provided compartment. The player first completing the most circuits, i.e., having lighted the most lamps 65, wins, as earlier disclosed. The game will ordinarily be completed before all the modules in the set have been used, or selected. However, in certain rare instances most of the playing pieces in the module set, or in some cases all, will have been used before the game is completed. In that case, most of the playing locations on the game board will be occupied.

Figure 9:
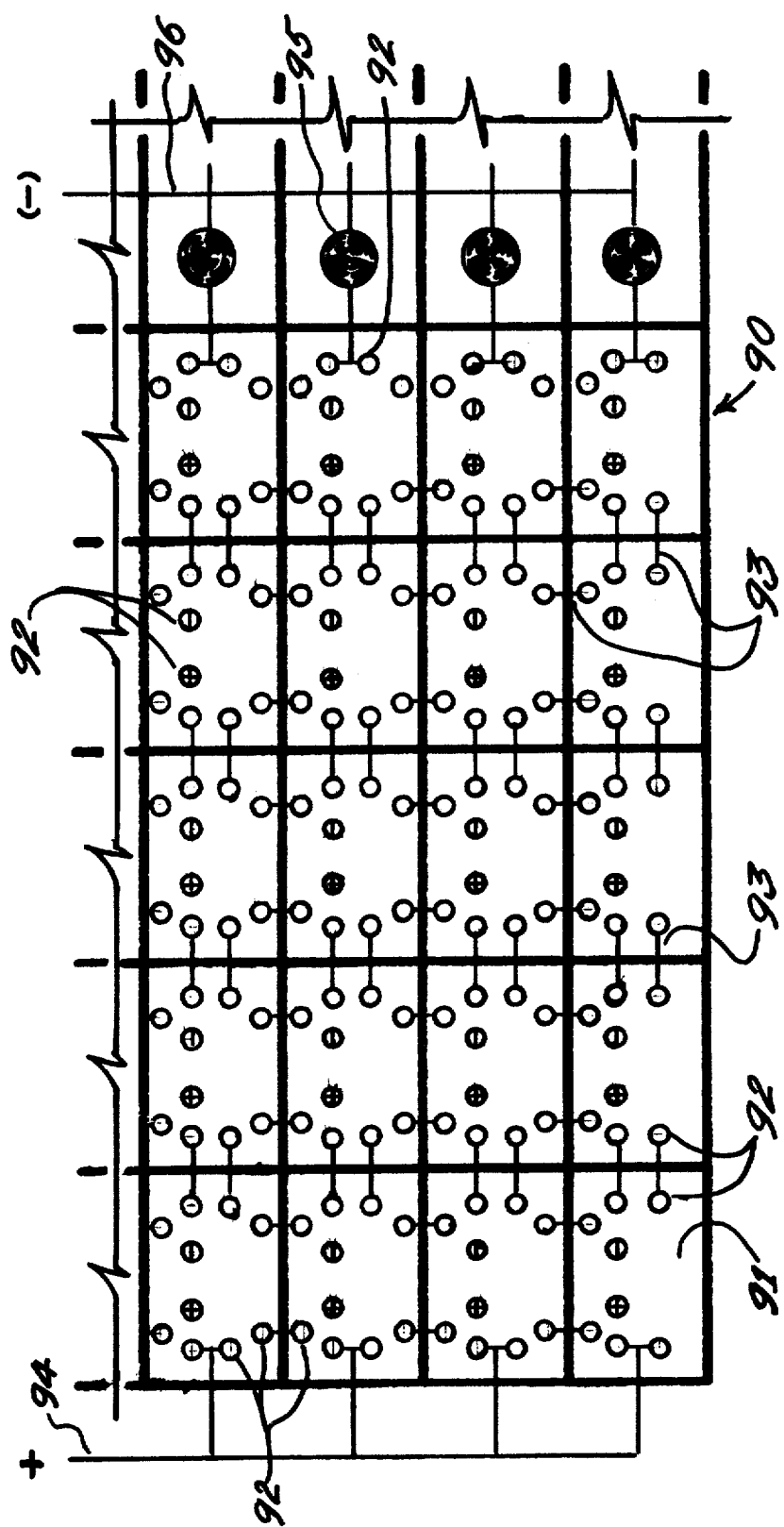
FIG. 9 shows part of one playing area of a game board used in the electrical version of the game using electronic circuitry components.

Turning now to FIG. 9 of the drawing, there is disclosed a somewhat more sophisticated version of an electrically operating game according to my invention, involving the use of solid state electronic components. Shown in this figure of the drawing is a portion of one playing area 90 of a game board for use in this version of the game, having a layout such as that shown for the simulated version earlier disclosed, except that, in this case, the board and modules are internally wired so that an actual electronic circuit can be constructed during play. As shown by the drawing, each of the playing locations 91 are provided with a plurality, desirably 8, of male jacks 92. And the male jacks in adjacent locations, as before-disclosed in the case of the game board in FIG. 6, are electrically interconnected, as indicated by inter-connections 93. Jacks 92 in the outer horizontal rows of playing locations are connected in parallel to positive lead 94 of a power source (not shown). And those playing locations in the inner horizontal rows, in each vertical row, are as indicated connected in parallel to an electrically operated lamp 95 which, in turn, is connected to the negative lead 96 of the low voltage power source. Thus, when a circuit is completed from the positive side of the playing area to the negative side, by placement of the modules on the playing board, a lamp will be turned on, indicating such a completed circuit.

For use with this version of the game, there are, as shown in FIG. 10, modules such as represented by reference 100, representing various solid state electronic devices, e.g., various types of "Gates". Each of these modules or playing pieces, as before-described, is provided on its top surface with a desired electronic component symbolically represented, as well as the various electrical connections leading to and from it. In this case, referring to FIG. 10(a) an "AND" Gate 101 is represented having input leads 102, 103, 104, and 105, and output leads 106, having branches 107-110, all being represented diagrammatically on the top surface of the module or playing piece. Internally of the module, as shown more clearly in FIG. 10(b), there are provided the actual interconnections between the "Gate" and the respective input and output female jacks 111-118. As indicated by reference to FIG. 10(c), the location of the female jacks must correspond spatially to the male jacks in any particular playing location on the game board.

In playing this version of the game, as in the simulated electronic version disclosed earlier, the modules can be played on the board only in one direction. Thus, as indicated on the game board, certain male jacks provide for a positive feed to each playing area. Others, as indicated, provide for a negative feed. The adjacent playing locations are inter-connected, as shown in the drawing. The jacks in the outer horizontal row of playing positions, in each vertical row, are connected in parallel to the positive lead 94 from the power source and those in the inner horizontal row, in each vertical row, are in turn connected to the negative lead of the power source. Or, as is preferred and as is shown in FIG. 9 of the drawing, the negative lead is connected to an electrically operated lamp which, in turn, is then connected to the negative lead.

With either version of the game disclosed, players will be exposed to a relatively large variety of playing pieces symbolizing electrical and electronic components. In the electrically operating versions not only must a player visualize constructing and tracing an electrical or electronic circuit, that circuit on completion will be signaled by activation of a device such as an electrically operated lamp or LED. It could even be a bell or other alarm sound, if desired.

As many different embodiments of this invention will now have occurred to those skilled in the art, it is to be understood that the specific embodiments of the invention as presented herein are intended by way of illustration only and are not limiting on the invention, but that the limitations thereon can be determined only from the appended claims.

What I claim is:

1. Educational game useful for teaching the recognition of electrical and electronic instrumentalities and the construction and tracing of electrical and electronic circuits comprising
    (a) a plurality of modules of predetermined shape each provided on its top surface with a visual representation symbolizing an electrical or electronic instrumentality for use in constructing simulated electrical or electronic circuits;
    (b) a game board divided into two playing areas in opposition to one another, each said playing area defined by an outer row of adjacent, abutting playing positions and an inner row of adjacent, abutting playing positions, and a plurality of rows of adjacent, abutting playing positions located between said outer and inner row whereby said rows of playing positions define a plurality of horizontal and vertical rows of adjacent, abutting playing positions, each said playing position being of the same predetermined shape as each said module for location of one of said modules in the simulated construction of an electrical or electronic circuit, a line provided on each said playing area adjacent said outer row of adjacent, abutting playing positions simulating a positive lead from a power source, a line provided on each said playing area adjacent said inner row of adjacent, abutting playing positions simulating a negative lead from a power source, said positive and negative leads being connected respectively to each playing position in the outer and inner rows of playing positions whereby a plurality of parallel potential circuits are provided, and an indicating means represented as a lamp located between each playing position in the said inner rows and said simulated negative leads for simulating the completion or blocking of an electrical circuit; and (c) colored markers for placement on the said indicating means to show when a player's electrical circuit is completed or blocked.

2. Educational game useful for teaching the recognition of electrical and electronic instrumentalities and the construction and tracing of electrical and electronic circuits according to claim 1 wherein the colored markers correspond in size to the lamps provided on the game board and comprise colored markers of two different colors for use by the players, respectively, for indicating that an electrical circuit is completed and a lamp is lighted, and markers of a third color for indicating that an electrical circuit is blocked.

3. Education game useful for teaching the recognition of electrical and electronic instrumentalities and the construction and tracing of electrical and electronic circuits according to claim 2 wherein the two different colored markers comprise red and green markers and the third colored marker is gold.

* * * * *